United States Patent
Zhang et al.

(10) Patent No.: US 12,520,785 B2
(45) Date of Patent: Jan. 13, 2026

(54) METHOD FOR BREEDING NEW PURPLE-ORANGE CHINESE CABBAGE GERMPLASM

(71) Applicant: NORTHWEST A&F UNIVERSITY, Xianyang (CN)

(72) Inventors: Lugang Zhang, Xianyang (CN); Qianqian Lu, Xianyang (CN); Qiong He, Xianyang (CN); Yihua Xue, Xianyang (CN); Shuai Ma, Xianyang (CN); Xiaomin Ma, Xianyang (CN); Shanshan Nie, Xianyang (CN)

(73) Assignee: NORTHWEST A&F UNIVERSITY, Xianyang (CN)

( * ) Notice: Subject to any disclaimer, the term of this patent is extended or adjusted under 35 U.S.C. 154(b) by 389 days.

(21) Appl. No.: 17/596,462

(22) PCT Filed: Mar. 24, 2020

(86) PCT No.: PCT/CN2020/080765
§ 371 (c)(1),
(2) Date: Dec. 10, 2021

(87) PCT Pub. No.: WO2021/189221
PCT Pub. Date: Sep. 30, 2021

(65) Prior Publication Data
US 2022/0304265 A1    Sep. 29, 2022

(51) Int. Cl.
A01H 1/04     (2006.01)
A01H 5/12     (2018.01)
A01H 6/20     (2018.01)

(52) U.S. Cl.
CPC .................. A01H 1/04 (2013.01); A01H 5/12 (2013.01); A01H 6/203 (2018.05)

(58) Field of Classification Search
CPC .................................. A01H 6/203; A01H 1/04
See application file for complete search history.

(56) References Cited

FOREIGN PATENT DOCUMENTS

| CN | 1732749 A | * | 2/2006 | |
|---|---|---|---|---|
| CN | 103149165 A | * | 6/2013 | |
| CN | 108018290 A | * | 5/2018 | ........... C07K 14/415 |

OTHER PUBLICATIONS

Zhang et al., 2013, Fine mapping and identification of candidate Br-or gene controlling orange head of Chinese cabbage (*Brassica rapa* L. ssp. pekinensis). Molecular breeding, 32, 799-805 (Year: 2013).*

Junqing et al., 2016, Genetic analysis and mapping of the purple gene in purple heading Chinese cabbage. Horticultural Plant Journal, 2(6), 351-356. (Year: 2016).*

Fehr et al., 1991, Principle of Cultivar Development, Theory and Technique ;Development of Self-pollinated cultivar, vol. 1, pp. 388-400. (Year: 1991).*

Sun et al., 2021, Genetic analysis of the "head top shape" quality trait of Chinese cabbage and its association with rosette leaf variation. Horticulture Research, 8. (Year: 2021).*

Yan et al., 2022, Genome-wide identification and expression analysis of WRKY family genes under soft rot in Chinese cabbage. Frontiers in Genetics, 13, 958769. (Year: 2022).*

Zhang '06, CN_1732749_A_I_English Translation, Published 2006. (Year: 2006).*

Zhang '13, CN_103149165_A_I_English Translation, Published 2013. (Year: 2013).*

Zhang '18, CN_108018290_A_I_English Translation 2018. (Year: 2018).*

Lee et al., 2014, Association of molecular markers derived from the BrCRISTO1 gene with prolycopene-enriched orange-colored leaves in *Brassica rapa*. Theoretical and applied genetics, 127, 179-191. (Year: 2014).*

Wu, Junqing, et al; "Genetic Analysis and Primary Mapping of the Purple Gene in Purple Heading Chinese Cabbage"; (Acta Horticulturae Sinica), No. 06, Jun. 25, 2016 (Jun. 25, 2016), pp. 1079-1088.

Zhang, Junxiang; "The Molecular Mechanisms on Formation of Orange Head Chinese Cabbage and *Arabidopsis* Young Yellow Leaves Mutants"; Chinese Doctoral Dissertations Full-Text Database, No. 4, Apr. 25, 2016 (Apr. 25, 2016); 5 pgs.

International Search Report issued in International Application No. PCT/CN2020/080765; mailed Jan. 4, 2021; 12 pgs.

* cited by examiner

*Primary Examiner* — Amjad Abraham
*Assistant Examiner* — Santosh Sharma
(74) *Attorney, Agent, or Firm* — HAUPTMAN HAM, LLP

(57) ABSTRACT

A method for breeding new purple-orange Chinese cabbage germplasm crosses the purple head Chinese cabbage inbred line 11S96 as the male parent and the orange Chinese cabbage inbred line 11J11 as the female parent. On the basis of selecting individual plants with good heading property in the $F_2$ population, molecular markers are used to select individual plants carrying the purple-head gene and the orange gene. Through selfing of individual plants for three consecutive generations, a new Chinese cabbage germplasm with green outer leaves and purple-orange head leaves is bred. This method aggregates the purple-head gene and orange gene which are expressed in the head leaves of Chinese cabbage, creating a new Chinese cabbage germplasm with purple-orange head leaves. It enriches Chinese cabbage breeding materials, lays the foundation for breeding the new purple-orange Chinese cabbage variety, and sets a precedent for the aggregation of the head color traits of Chinese cabbage.

5 Claims, 4 Drawing Sheets
Specification includes a Sequence Listing.

SEQUENCE LISTING

```
<160> NUMBER OF SEQ ID NOS: 9

<210> SEQ ID NO 1
<211> LENGTH: 22
<212> TYPE: DNA
<213> ORGANISM: Artificial Sequence
<220> FEATURE:
<223> OTHER INFORMATION: Synthesized

<400> SEQUENCE: 1
cagaaacatc agggttgaaa tc                                          22

<210> SEQ ID NO 2
<211> LENGTH: 18
<212> TYPE: DNA
<213> ORGANISM: Artificial Sequence
<220> FEATURE:
<223> OTHER INFORMATION: Synthesized

<400> SEQUENCE: 2
ttactgccga aagcgaaa                                               18

<210> SEQ ID NO 3
<211> LENGTH: 21
<212> TYPE: DNA
<213> ORGANISM: Artificial Sequence
<220> FEATURE:
<223> OTHER INFORMATION: Synthesized

<400> SEQUENCE: 3
tgtctatctg acttgtggtg t                                           21

<210> SEQ ID NO 4
<211> LENGTH: 25
<212> TYPE: DNA
<213> ORGANISM: Artificial Sequence
<220> FEATURE:
<223> OTHER INFORMATION: Synthesized

<400> SEQUENCE: 4
atacctcata acactgcatc catag                                       25

<210> SEQ ID NO 5
<211> LENGTH: 536
<212> TYPE: DNA
<213> ORGANISM: Artificial Sequence
<220> FEATURE:
<223> OTHER INFORMATION: Synthesized

<400> SEQUENCE: 5
cagaaacatc agggttgaaa tctaaaccca gaaaataaac ccaatatggt ataggtttac   60
ccgtgggtac ccaaagtatt atcttattta ttctgaagat catgtaaaac tcatttatgg  120
ttttaacgag aaaacttgta aagttgtttt tgtggtttta gcggaaattt ttcttttgc   180 ggttttggt cggtaatttt attttgtggc ttggttgaa aactcatttt tgcggtttgc    240
```

```
gggaaaaata atctttctgg ttttgacgaa aaaattcggt tttacggtttt ttgcgagaaa      300 attcggttta gcagttttgg caggaaacct cgcttttgcg gttttggcgg aaaaactcgt      360
ttttgatttt gacggaaaaa cttgttttta cggttttggg gaaactcggt tttcggcttt      420
gacgggaaaa ctcgattttt cgattttggc gggaaaactc gattttgcgg ttttggcggg      480
aaaactcggt ttttctgttt tggcggaaaa accatgtttt tcgctttcgg cagtaa         536

<210> SEQ ID NO 6
<211> LENGTH: 185
<212> TYPE: DNA
<213> ORGANISM: Artificial Sequence
<220> FEATURE:
<223> OTHER INFORMATION: Synthesized

<400> SEQUENCE: 6
tgtctatctg acttgtggtg tcacccttat atatatagtt acattgttat tagaatttgg       60
attaagtaat ggacctctgt tggtacatcg tacatgtata atatcgatgc ggttgttttt      120
tttttttttt tgacgtcgaa agtttattat attactcgaa ctatggatgc agtgttatga      180
ggtat                                                                  185

<210> SEQ ID NO 7
<211> LENGTH: 178
<212> TYPE: DNA
<213> ORGANISM: Artificial Sequence
<220> FEATURE:
<223> OTHER INFORMATION: Synthesized

<400> SEQUENCE: 7
tgtctatctg acttgtggtg tatccttata tatatagtta cattgttatt agaatttgga       60
ttaagtaatg gacctctgtt gcgtacatgt ataatatcga tgcggttgtt ttttttttt      120 ttttgacgtc gaaagtttat tatattactc gaactatgga tgcagtgtta tgaggtat       178

<210> SEQ ID NO 8
<211> LENGTH: 5292
<212> TYPE: DNA
<213> ORGANISM: Brassica campestris ssp.pekinensis(Lour.)Olsson

<400> SEQUENCE: 8
atgaatctgt gtctacacaa tcccgtaacg tgtgctgatc gcagctcctc cttgtcatcg       60
gccttgaaga cttcaaatta caaactgggt acttcaaagt ttgggttttt aaagcatcgg      120
aagaagaatc atgtggttgc tgtgaggtct gtttctacga gtacggtcac taccgttaaa      180
gaagagacga agagagagag tcaagtgtac gacgccatcg tcatcgggtc tgggattgga      240
ggattagttg cggcgactca attagctgtt aaagaagcta agttttagt tttggagaag      300 tatctgatcc ctggtgggag ctctggttac tacgaaagag atgggtacac attcgatgtg      360
ggttcttctg tcatgtttgg tttcagcgat aaggttcgtt tcgtttgctc tcgtaaagac      420 tctccctta gatgagaatg ttgagtcacc caccatcatc tctattgagt tatattctta      480 agtgaaaaa ataaaaataa gtaaattact ctatttatat agcataaatc aatttttac      540 tctgttatgg agtgaaaata gagtaatatt agagcatttt tactctaaaa atagagtgtg      600
gtcggagatg gactaatgag tttagttttg atggggacag gggaaactaa acttgataac      660
tcaggcgttg aaggcagttg gtcgtgagat ggaggttata cctgatccca ccactgtcca      720
tttccatctt cccaatgatc tctctgttca ggttcataga gagtatgatg agttcgttaa      780
tgagcttatt agcaagtttc cgcacgagaa ggaagggatt cttggattct atggcgtctg      840
```

```
ctggaaggtt ctgatgttgc tttttttactt aattgaatat ttgtaagagt gtgtatttaa    900
agattacaga ttggaacaga tcttcaactc attgaactct ttggaactga agtcgcttga    960
agagcctatc tacctttttg gacagttctt tcagaagccc cttgaatgct tgacactcgg   1020
tactctttt gatgtttgtt tgtgtattta ttagtttctg tgagtgtata cattgaatct    1080
ttttatatta ttctctgtga tttatgtaca gcttattact tgcctcaaaa tgctggggat   1140
atagctcgga agtacataaa ggatcctcag ttactgtctt tcattgacgc agaggttagc   1200
aaaaaatgtc atttggtcca aacatgcaca gtttatttta caccatttgt atttttttgcc  1260
tgcagtgttt cattgtgagc acagtgaatg ctttgcagac gccgatgatc aatgcaagta   1320
tggtaggatt cttgtttttg ggcatttttgg tgtctactcc atgtttccct ttctgttcag  1380
tttctaagtg ttcaaggaca ggttttatgt gacaggcact atggagggat taactaccct   1440
gttggtggtg ttggtgggat tgcaaggtct ttagcaggag gactagttga tcaaggaagt   1500
gaaatattct acaaagctaa tgtgaaaagc ataattcttg atgatggaaa ggctgtaagt   1560
ttctgtataa ctcttgctac attgattcca agttgttgtt ctaaaaatcg atctagacct   1620
ccgactagtc agcaaatcag tcctaaagaa aacaattttt cggtttagat gctcaaaata   1680
tcggtctagg cgcccgcata atcaataatc ccatataaag cttccaacta cccctaccgt   1740
tcttgaacat tgattcttgc ttaacctctt gaaattctta tttggttgtg ttttctatct   1800
tcaggtgggt gtaaggctag cagatggaag agaattcttc gctaaaacga taatttctaa   1860
tgctacaaga tgggatacgt ttggtaagag aaaacaatga cttgcctaag tgttgaatag   1920
gtgtcttgtt tggtaagaat acttagcata gtattactaa tgatgtaggg aagctgttga   1980
aaggagaaaa gcttccaaaa gaagaagaaa acttccagaa agtctacgtg aaggctccat   2040
cgtttctttc aatccacatg ggtgttaaag cagaggttct ccctccagat acagattgcc   2100
atcatttcgt acttgaggtt tgttagtttc ttactaagat ctattattcc ctttgacaga   2160
ttcatagtta tttgaatagt ggttatgttc ttttgttgca acctgttagg atgattggaa   2220
gaatctggag gagccttatg gcagtatctt cctcagcatc ccaaccattc ttgatccatc   2280
cttggctcca gatggtcgac atatactcca catatttaca acttcttcca ttgaagattg   2340
ggaggtaaga ggctgatctt aaaagagtga gaccaagcat caattatata tgccatctta   2400
tttgaccgtt tcatctaaat tttggtacta tagggactca ctccaaaaga gtatgaggct   2460
aaaaaagaag aggtggcagc tggaatcata cagaggctag agaaaaaact gtttcctggg   2520
ctcagttcat ctattacttt taaggaggtt agacaatcta tgttcctgcc tagatttgcc   2580
aattcacatc tgtatatcta aggtgttttt atgaggcagg tgggcacacc aagaacacac   2640
aggcgatatc ttgctaggga taagggaacg tatggaccaa tgccaagagg aacaccaaaa   2700
ggtttactag gcatgccgtt taacacaact gtaagtcaaa agaaaagatt agatggttcc   2760
cttctggggc ttaactaaat ggttttggct gattgtaata ggctatagat ggtttgtact   2820
gcgttgggga tagttgtttt cctggtcagg gagttatagc tgtggctttc tcaggagtga   2880
tgtgtgctca tcgtgtagct gctgacattg gtgagaaaat ttgttataga cacttgttga   2940
ttgctatgag agtagggatg ttaacgtggg taaaataacc cagcccagcc caacccacaa   3000
ataacccaac ccagtttata cccaacctgc aaaaacccag aaacatcagg gttgaaatct   3060
aaacccagaa aataaaccca atatggtata ggtttacccg tgggtaccca agtattatc   3120
ttatttattc tgaagatcat gtaaaactca tttatggttt taacgagaaa acttgtaaag   3180
```

```
ttgttttttgt ggttttagcg gaaattttc ttttttgcggt ttttggtcgg taattttatt    3240
ttgtggcttg gttggaaaac tcatttttgc ggtttgcggg aaaaataatc tttctggttt    3300
tgacgaaaaa attcggtttt acggtttttg cgagaaaatt cggtttagca gttttggcag    3360
gaaacctcgc ttttgcggtt ttggcggaaa aactcgtttt tgattttgac ggaaaaactt    3420 gttttacgg ttttggggaa actcggtttt cggctttgac gggaaaactc gattttttcga    3480 ttttggcggg aaaactcgat tttgcggttt tggcgggaaa actcggtttt tctgttttgg    3540
cggaaaaacc atgttttttcg ctttcggcag taaaaatcgt tttggcggga aaattgagtt    3600
ttacggcatt ggcgggaaaa cacctttttgc ggttttggcg gaaaaactcg attttggggc    3660
tttcagtcgg aaaactcgat tttacggttt tagcgggaaa actcagtttt gcagttttgg    3720
tgagaaaact cagttttgcg gttttggcgg gaaacttagt tttatggttt tggcggaaaa    3780
acaagttttg tggtttcggt agaaaacctc gattttttcgg tttcggcggg aaaactcgtt    3840
tttggtttct gtgagaaata ttattttttag ggttttttgtg gaaaaaatta ttttttggtt    3900
ctgacggaaa aaacgttttt tgcaattttt atataattta attaaaatgg tgaaaatcta    3960
tatatataat tgaaaaccca tgggtacacc attacccttt tgtatttacc caacataaat    4020
atgggtttta aaattaatac ccatggttga cccaattaat cttagatggg taaaaaccca    4080
gcctattatt agtgggtttg ggtaaaccca tgggtaacta cccatgttaa catccctata    4140
tgagagtaag aagctaacat ttttttttca tattttgatt tgtagggctt gagagaaaat    4200
caaaggtact tgatgctggt cttcttggtt tacttggttg gttaaggaca ctcgcatagt    4260
ctctaaaggg tacaggacac aaagctagtg gaagtgttgc tcaagtccat aggagcggct    4320
tttactatga acaaccttt ttatttgtgg tttaggatca agaagagttg cacatagata    4380
agaaaaatat ttttccatat ccaatacttt ttttgtcttt ctcttcatac actgataaaa    4440
tcaaattaag gaatctaatc ctagtatcaa ctacttatgt tcagataaac atactagttt    4500
ggagaagttt ggttcaggta tcatcatcat cttcattatt cctctcacta gaaccctccc    4560
accaagaaac agggcccata ccatcatcat ccagagtccc ctgcacattt cacaagattt    4620
catattaact cacaaaaaga agcaaaccaa aaacttcact aggagactta atacaactag    4680
tttcgttata taaattatgc aaatacaaga ggaatatagc ttcagagaat gagaaactta    4740
caatgaccac cataggagca aaaggcttta catcctctgc tcgctcagtt ggaacaggtg    4800
ggtagctaat tttctcaact ctaaaattga tctgcttatt gacatcgcaa cgttataaac    4860 tttttttcaaa actttgcacc taaaggaaaa tggggaacca aaaaaaggtt aacctgacat    4920
gaatcgtcga taatatactc ttgttcttca aatatccaaa cccatctcat ttgattcctg    4980
ttaaatgtta aaaaaaaaac atttaactttt gtgatccagt gaaatatata cagatgcagg    5040
tttaaaaatg ctcaatacct attgtaaggg tcaggctcac agcggttagg tcttggtata    5100
agtggagcag gcacatatat atcttcaaag aatccaagag tcactgccac agggaaccat    5160
aagtgtgcat atgaaaacgt tataagtaac cattatgcac aacactagta gtactcacag    5220
cgtaagccat tggaatcaga ttctttgaac cttgcagcaa tgacctcacc aacgaatgga    5280
cgaaacacta ca                                                        5292
```

<210> SEQ ID NO 9
<211> LENGTH: 1665
<212> TYPE: DNA
<213> ORGANISM: Brassica campestris ssp.pekinensis(Lour.)Olsson

<400> SEQUENCE: 9

-continued

```
atggagggtt cgtcccaagg gttgaaaaaa ggtgcatgga ctgctgaaga agataatctc    60
ttgaggcaat gcattgataa gtatggagaa gggaaatggc accaagttcc tttaagagct   120
ggtatgtctt ttttttttgat aacataagag ctggtatgct acttttatta attttcacac   180
acacacacac acacatataa ctaataagta cgtatattct ttttattttt cagtacattt   240
attctctttc tctctgtcta gtattaggaa attaattaac accggggtac acaatcattg   300
tttttctttt cgttttaatg aaggaatcat agattcatat gttctaatgt ttttcatgaa   360
aaaaaaaaca tttgcgttct tcatgtttaa ttacaaagcg agaaaatgtc aactctcttt   420
attgattcgt cgttttttctt tttttttttg agaaagagct tttttgatta gtgaactttt   480
ctgcacgaac ccgtgtgttt gtgtggaata tgttgtttat tctggtgtac tttgatcctt   540
catgataaaa ttttacttcc tttgttatta aatataagat attttggtag aagcaaacat   600
attaagaaaa ctattttttg tctagaaaat atcattaaaa ctataaatta atggtgttca   660
accaattaca aaatagacta ttaaaatatg attgggttca cagtttttaa taaagtaaaa   720
gttacctaga aaattgaaaa cattttatat attggataat taaaacatca aaattcaata   780
aaacatccta tttttaggaa catatggagt aggagacgcg aatgcagttt ttgctcgttc   840
ttttaataat attaaatgtc aattattggt tttgtaggtc taaatcggtg caggaagagt   900
tgtagactaa gatggttgaa ctatttgaag ccaagtatca agagaggaaa actcaactcc   960
gatgaagttg atcttcttat tcgccttcat aagcttttag gaaacaggtt tacattccag  1020
acacaaattc aactgtattt cgtatcctca ttcggtctaa tctaatcatt tgatttgttt  1080
ttttttttga taaaaatact taaatttatt tcatatgtaa atgatccatt actaagtcaa  1140
atatatccct aattttttcaa atgcatgctt aggtggtctt taattgctgg tagattaccc  1200
ggtcggaccg ccaatgacgt caaaaattac tggaacaccc atttgagtaa gaaacatgaa  1260
ccgggttgta agacccagat gaaaaagaga acattcctt gctcttatac cacaccagcc   1320
caaaaaatcg acgttttcaa acctcgacct cgatccttca ccgttaacag cggctgcagc  1380
cataataatg gcatgccaga agctggcatt gttcctctat gccttggaca caacgatact  1440
aataatgttt ctgaaaatat aatcacatgt aacaaagatg atgataaatc tgagcttgtt  1500
agtcatttaa tggatggtca gaataggtgg tgggaaagtt tgctagatga gagccaagat  1560
ccagctgcgc tctttccaga aactacagca ataaaaaagg gcgcaacctc cgcgtttgac  1620
gttgagcaac tttggagcct gttggatgga gaaactggaa cttga                  1665
```

METHOD FOR BREEDING NEW PURPLE-ORANGE CHINESE CABBAGE GERMPLASM

RELATED APPLICATIONS

The present application is a U.S. National Phase of International Application Number PCT/CN2020/080765 filed Mar. 24, 2020.

TECHNICAL FIELD

The invention belongs to the field of agricultural plant germplasm resources and breeding, and specifically relates to a method for breeding new Chinese cabbage germplasm, in particular to a method for breeding new purple-orange Chinese cabbage germplasm.

INCORPORATION BY REFERENCE

The sequence listing provided in the file entitled PCTCN2020080765_SQLRev.txt, which is an ASCII text file that was created on Nov. 4, 2021, and which comprises 11,397 bytes, is hereby incorporated by reference in its entirety.

BACKGROUND

Chinese cabbage is native to China and belongs to the Brassica genus Brassica species Chinese cabbage subspecies of the Brassicaceae family. The leaf head of Chinese cabbage has soft texture, delicious flavor, and rich nutritional quality. It is an important vegetable crop in China and Asian countries, and it has also developed rapidly in Europe and the United States in recent years. With the improvement of people's living standards, the commodity quality, flavor quality and nutritional quality of Chinese cabbage have received increasing attention from domestic and foreign scholars.

The color of the leaf head of Chinese cabbage is usually white. In recent years, yellow, orange, saffron yellow, orange-red leaf head and purple Chinese cabbage have appeared on the market. The yellow, orange, saffron yellow, orange-red leaf head and purple Chinese cabbage varieties represent important new scientific and technological achievements in the quality improvement of Chinese cabbage, providing consumers with Chinese cabbage varieties with beautiful color, sweet raw taste and high nutritional quality. Colored Chinese cabbage is favored by consumers, not only because it satisfies people's visual enjoyment, but also because of its rich nutrients, which have a strong health care effect on the human body.

Compared with white Chinese cabbage, orange Chinese cabbage accumulates a lot of carotenoids. Carotenoids are $C_{40}$ or $C_{30}$ alkenyl terpenoids composed of eight isoprenoids. Carotenoids are long-chain molecules containing multiple conjugated double bonds. As the number of conjugated double bonds changes, the color varies from yellow, orange to red. The number of conjugated double bonds determines the color of different types of carotenoids. For example, lycopene is red, lutein is yellow, and phytoene is colorless. Carotenoids play an important role in human nutrition and health. For example, β-carotene is the precursor of vitamin A synthesis. Lutein and lycopene can enhance the body's antioxidant capacity and prevent some cancers. The development of Chinese cabbage quality breeding in China began during the "Ninth Five-Year Plan" period. Northwest A&F University has been carrying out colored Chinese cabbage selection and breeding since 1993, and bred the orange heading Chinese cabbage germplasm resources in 1996 and new variety of orange heading Chinese cabbage in 2002.

At present, many domestic breeding teams have successively bred orange, orange red head, and yellow head Chinese cabbage varieties. Nutrition analysis (tested by Shaanxi Provincial Quality Supervision and Inspection Station) showed that the content of carotenoids, $V_C$, soluble sugar and crude protein of head leaves of new orange Chinese cabbage variety "Jinguan No. 1" were 3.12 times, 1.30 times, 1.15 times and 1.26 times of that of high-quality common cabbage Qinbai No. 2, the cellulose was reduced by 18.5%, and the dry matter was increased by 11.73%. Zhang Deshuang et al. compared the nutritional components of orange head, yellow head, white head and purple head Chinese cabbage, and the results showed that: the content of Vc (30.6 mg/100 g fresh vegetable), β-carotene (0.26 mg/100 g fresh vegetable), crude fiber, Ca, Fe and thiocyanate radical of the orange head variety was the highest among the four types of Chinese cabbage, so the main direction should be the breeding of orange head varieties in the quality breeding of Chinese cabbage.

The large accumulation of anthocyanins in plant vacuoles is the main reason that causes the leaves of Chinese cabbage to turn purple. Compared with common Chinese cabbage, purple-head Chinese cabbage has a higher anthocyanin content and is a potentially important vegetable rich in anthocyanin. Anthocyanins are phytochemicals with biological activity. Due to the presence of hydroxyl groups in their structure, they can scavenge free radicals, and this feature is related to total antioxidant activity. Studies have found that anthocyanin compounds can prevent many chronic diseases caused by oxidative stress. The selection and breeding of purple Chinese cabbage in China and other countries was relatively late. The scientists and technicians of Northwest A&F University began to breed purple Chinese cabbage in 1999; in 2004, the germplasm resource of Chinese cabbage with purple outer leaves and white head leaves was bred; and germplasm resource of purple-head Chinese cabbage with green outer leaves and purple head leaves were bred in 2008. Sun Rifei et al. (2006) obtained a new germplasm of purple-red Chinese cabbage through distance hybridization of Chinese cabbage and purple mustard and continuous backcrossing. Zhang Deshuang et al. (2007) crossed Chinese cabbage with foreign purple no heading Chinese cabbage variety "Violet", used the method of multi-generation backcross breeding, and obtained 2 purple Chinese cabbage intermediate materials. However, the study found that starting from the first backcross generation, as the number of backcross generations increased, the purple traits of the backcrossed offspring were segregated to varying degrees, resulting in fewer and fewer purple individuals in the backcrossed offspring. At the same time, there were also differences in the degree of leaf purple in purple individuals, which varied greatly. In 2008, South Korean Company DANONG established "China DANONG" in Qingdao, Shandong Province to sell Korean "Purple Leaf Spring Baby" Chinese cabbage. "Purple leaf spring baby" has characteristics of purple outer leaves, yellow inner leaves, strong disease resistance, early maturity, high yield, the head leaves folded, cylindrical shape, tightly headed, resistant to bolting, purple leaves rich in nutrients, and good commercial properties.

Although the germplasm resources and new varieties of orange Chinese cabbage, purple Chinese cabbage and purple-head Chinese cabbage have been created, so far there is no report of purple-orange leaf head Chinese cabbage that combines orange Chinese cabbage and purple (purple-head) Chinese cabbage.

SUMMARY OF THE INVENTION

The purpose of the present invention is to provide a method for breeding new purple-orange Chinese cabbage germplasm. The purple-orange Chinese cabbage new germplasm bred by this method, of which the rosette leaves and the outer leaves of the leaf head are green, and the head leaves are purple-orange, rich in both of carotenoids and anthocyanins.

The method for breeding purple-orange Chinese cabbage provided by the present invention comprises the following steps:
  A. Cross the orange Chinese cabbage as the female parent and the purple-head Chinese cabbage as the male parent to obtain $F_1$ generation plants;
  B. Select individual plants with strong disease resistance and good heading property from the $F_1$ generation plants for selfing to obtain $F_2$ generation plants;
  C. From the $F_2$ generation plants, individual plants with good heading property and carrying the orange gene and the purple-head gene is selected, and continuous selfing is performed to obtain the purple-orange Chinese cabbage.

In the above breeding method, in the step A, said orange Chinese cabbage is an orange Chinese cabbage inbred line 11J11. The plant characteristics of the orange Chinese cabbage inbred line 11J11 are as follows: the outer leaves are yellow-green and bright, the outer leaves are spreading on the ground, the head leaves closed and short head, round ball type, and head leaves are orange.

Said purple-head Chinese cabbage is a purple-head Chinese cabbage inbred line 11S96. The plant characteristics of the purple-head inbred line 11S96 are as follows: the outer leaves are green, head leaves closed and tall head, and narrow obovate head, and the head leaves are purple, and the purple is deepened from the outside leaf to the inside leaf.

In the above breeding method, in the step B, said strong disease resistance means its disease resistance is stronger than that of the female parent and the male parent (orange Chinese cabbage inbred line 11J11 and purple-head Chinese cabbage inbred line 11S96), and the disease resistance is specifically resistance to virus disease, soft rot and downy mildew disease.

Said good heading property means that its heading property is better than that of the female parent and the male parent (orange Chinese cabbage inbred line 11J11 and purple-head Chinese cabbage inbred line 11S96), and the heading property is specifically heading firmness.

In the above breeding method, in the step C, the orange gene is the Brcritso gene; the nucleotide sequence of said Brcritso gene is shown in SEQ ID NO.8 in the sequence listing;

The method for identifying whether the plant to be tested carries the orange gene specifically comprises the following steps: amplify the genomic DNA of the plant to be tested with primers consisting of the single-stranded DNA shown in SEQ ID NO.1 in the sequence listing and the single-stranded DNA shown in SEQ ID NO.2 in the sequence listing to obtain a PCR product; If the PCR product of the plant to be tested contains a fragment of 536 bp, the plant to be tested or the candidate carries the orange gene; if the PCR product of the plant to be tested does not contain a fragment of 536 bp, the plant to be tested or the candidate does not carry the orange gene.

Said purple-head gene is the BrMYB2 gene; the nucleotide sequence of the BrMYB2 gene is shown in SEQ ID NO.9 in the sequence listing.

The method for identifying whether the plant to be tested carries the purple-head gene specifically comprises the following steps: amplify the genomic DNA of the plant to be tested with primers consisting of the single-stranded DNA shown in SEQ ID NO.3 in the sequence listing and the single-stranded DNA shown in SEQ ID NO.4 in the sequence listing to obtain a PCR product; If the PCR product of the plant to be tested contains only fragment of 185 bp or both fragments of 185 bp and 178 bp, the plant to be tested or the candidate carries the purple-head gene; if the PCR product of the plant to be tested only contains a fragment of 178 bp, the plant to be tested or the candidate does not carry the purple-head gene.

In the above breeding method, in the step C, the number of consecutive selfing may be at least 3 times. In a specific embodiment of the present invention, the number of consecutive selfing is 3 times.

The above-mentioned breeding method may specifically comprise the following steps:
  1) Cross the orange Chinese cabbage inbred line 11J11 as the female parent and the purple-head Chinese cabbage inbred line 11S96 as the male parent to obtain $F_1$ generation plants; Plant the $F_1$ generation seeds to obtain $F_1$ generation plants, and select individual plants with strong disease resistance and good heading property from the $F_1$ generation plants;
  2) Selfing the individual plants obtained in step 1) to obtain the seeds of the $F_2$ population; plant the seeds of the $F_2$ population to obtain $F_2$ generation plants, and select the individual plants with good heading property and carrying orange gene and purple-head gene from the $F_2$ generation plants;
  3) Selfing the individual plants obtained in step 2) to obtain the seeds of the $F_2S_1$ population; plant the seeds of the $F_2S_1$ population to obtain $F_2S_1$ generation plants, and select the individual plants with good heading property and carrying orange gene and purple-head gene from the $F_2S_1$ generation plants;
  4) Selfing the individual plants obtained in step 3) to obtain the seeds of the $F_2S_2$ population; plant the seeds of the $F_2S_2$ population to obtain $F_2S_2$ generation plants, and select the individual plants with good heading property and carrying orange gene and purple-head gene from the $F_2S_2$ generation plants;
  5) Selfing the individual plants obtained in step 4) to obtain the seeds of the $F_2S_3$ population; plant the seeds of the $F_2S_3$ population to obtain $F_2S_3$ generation plants, and select the lines with good heading property and carrying orange gene and purple-head gene and with uniform horticultural traits from the $F_2S_3$ generation plants, which are the purple-orange Chinese cabbage.

Furthermore, in the step 1), the $F_1$ generation seeds are 5 hybrids (14ZF1 to 14ZF5); Plant 30 plants for each hybrid of the $F_1$ generation seeds to obtain total 150 $F_1$ generation plants, from the one hybrid(14ZF2) of $F_1$ generation plants, select 10 plants with strong disease resistance and good heading property;

In the step 2), the $F_2$ population seeds are 5 strains (14ZF2-1 to 14ZF2-5); Plant at least 100 plants for each strain of the $F_2$ population seeds to obtain 500 $F_2$ generation plants (in the present invention, each of the $F_2$ population strain is planted with 100 plants), from the one strain (14ZF2-2) of $F_2$ generation plants, select 20 plants with good heading property and orange gene and purple-head gene;

In the step 3), the $F_2S_1$ population seeds are 20 strains (16SF1 to 16SF20); Plant 30 plants for each strain of the $F_2S_1$ population seeds to obtain 600 $F_2S_1$ generation plants, from the one strain (16SF1) of $F_2S_1$ generation plants, select 10 plants with good heading property and orange gene and purple-head gene;

In the step 4), the $F_2S_2$ population seeds are 10 strains (17SF1 to 17SF10); Plant 30 plants for each strain of the $F_2S_2$ population seeds to obtain 300 $F_2S_2$ generation plants, from the $F_2S_2$ generation plants, select 100 plants with good heading property and orange gene and purple-head gene (select 10 plants each from 17SF1 to 17SF10);

In the step 5), the $F_2S_3$ population seeds are 60 strains (18SF1 to 18SF60); Plant 30 plants for each strain of the $F_2S_3$ population seeds to obtain 1800 $F_2S_3$ generation plants, and it was found among the $F_2S_3$ generation plants that the 18SF19 line has good heading property carrying orange gene and purple-head gene, with consistent horticultural traits, which is the purple-orange Chinese cabbage, and it is named as a new germplasm of purple-orange Chinese Cabbage 18SF19.

Furthermore, the step 2), step 3), step 4) and step 5) also include the following steps: Before harvesting Chinese cabbage in autumn, select intermediate materials strictly in accordance with the selection criteria; In autumn, first select plants with heading morphological character of Chinese cabbage, and then select plants with orange gene and purple-head gene from plants with heading morphological character of Chinese cabbage; The selected plants are then temporarily planted to survive the winter safely, and planted in a net shed (40 mesh gauze) in the spring of the following year (early March), bagged flower branch during the flowering period, and self-pollinated by a fixed skilled labour to harvest the seeds.

In the step 5), the horticultural traits specifically include the following traits: plant type, leaf color, petiole color, shape and size of leaf head, head type and degree of overlapping leaf, color of leaf head.

In the above breeding method, the purple-orange Chinese cabbage has the following characteristics: good heading property, closed head with high degree of overlapping leaf, high-narrow obovate head, the rosette leaves and outer leaves of the leaf head are green, the head leaves are purple-orange color, the purple color of the inner leaves of leaf head gradually deepens from outside to inside (from light purple to dark purple of the heart leaves), rich in both of carotenoids and anthocyanins.

The purple-orange Chinese cabbage bred according to the above method also belongs to the protection scope of the present invention.

The present invention also provides a primer pair for identifying whether the Chinese cabbage to be tested contains the orange gene Brcritso and/or a primer pair for identifying whether the Chinese cabbage to be tested contains the purple-head gene BrMYB2.

The primer pair used to identify whether the Chinese cabbage to be tested contains the orange gene Brcritso is a primer pair composed of the single-stranded DNA shown in SEQ ID NO.1 in the sequence listing and the single-stranded DNA shown in SEQ ID NO.2 in the sequence listing.

The primer pair used to identify whether the Chinese cabbage to be tested contains the purple-head gene BrMYB2 is a primer pair composed of the single-stranded DNA shown in SEQ ID NO.3 in the sequence listing and the single-stranded DNA shown in SEQ ID NO.4 in the sequence listing.

The application of the above breeding method or the purple-orange Chinese cabbage bred according to the above method or the application of the above primer pair in Chinese cabbage breeding also belongs to the protection scope of the present invention.

EMBODIMENTS

The following examples facilitate a better understanding of the present invention, but do not limit the present invention. The experimental methods in the following examples are conventional methods unless otherwise specified. The experimental materials used in the following examples, unless otherwise specified, are all purchased from conventional biochemical reagent stores. The quantitative tests in the following examples are all set to repeat the experiment three times, and the results are averaged.

The orange Chinese cabbage inbred line 11J11 in the following examples is described in the document "Mo Yunan, Zhang Lugang, Wang Guofang, Extraction and Determination of Total Carotenoids in Orange Heading Chinese Cabbage, Journal of Northwest A&F University (Natural Science Edition), 2014, 42(3): 1-9", is a stable inbred line selected by the Chinese Cabbage Research Group of the College of Horticulture, Northwest A&F University. The plant characteristics are: outer leaves are yellow-green and bright, outer leaves are spreading, closed head with high degree of overlapping leaf, short and round head, and the head leaves are orange.

The purple-head Chinese cabbage inbred line 11S96 in the following examples was described in the document "Duan Yanjiao, Zhang Lugang, He Qiong, etc., Expression of Transcriptional Factors and Structural Genes of Anthocyanin Biosynthesis in Purple-heading Chinese Cabbage, Acta Horticulturae Sinica 2012, 39 (11): 2159-2167", and it is a stable inbred line bred by the Chinese cabbage research group of the College of Horticulture, Northwest A&F University, from the hybridization of common Chinese cabbage and purple tsai-tai 95T2-5. The plant characteristics are: outer leaves are green, closed head with high degree of overlapping leaf, tall and narrow elliptic head, and the head leaves are purple, and the purple color is deepened from the outside to the inside.

Figure 1:
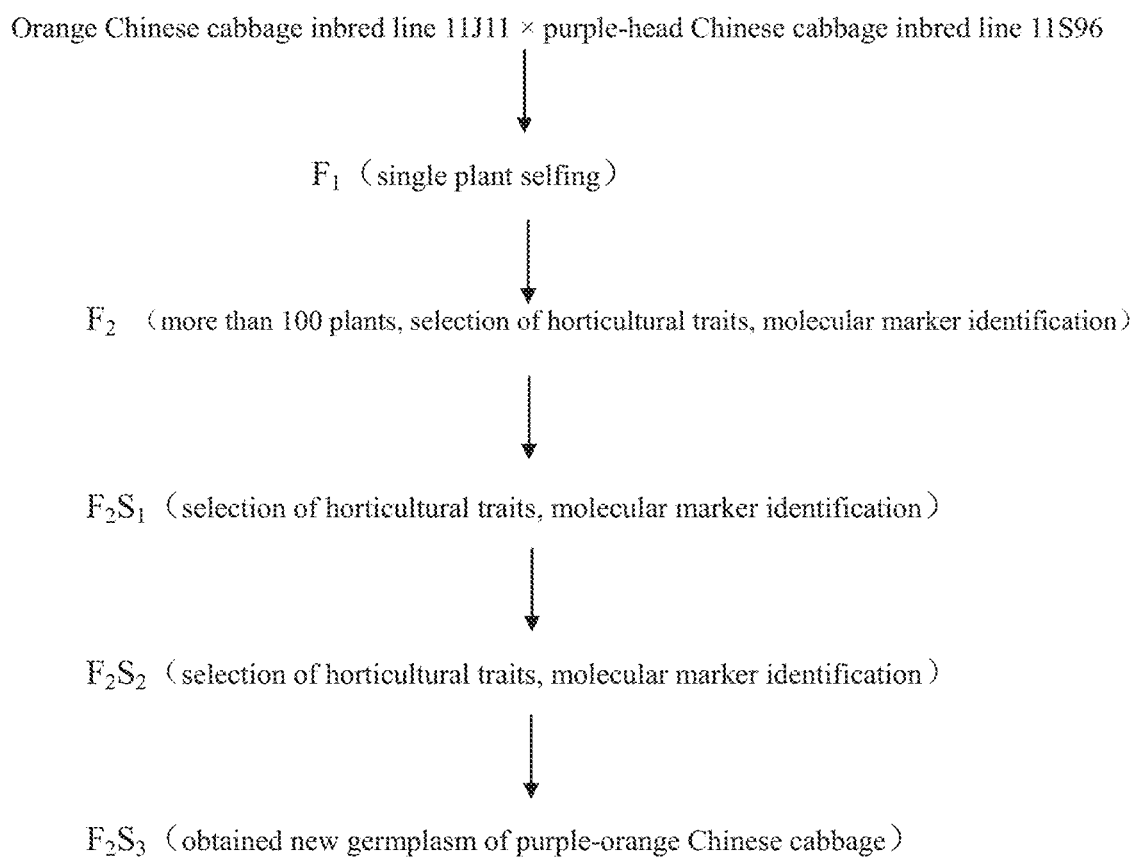
FIG. 1 is a flow chart of the breeding method of the present invention.
Figure 2:
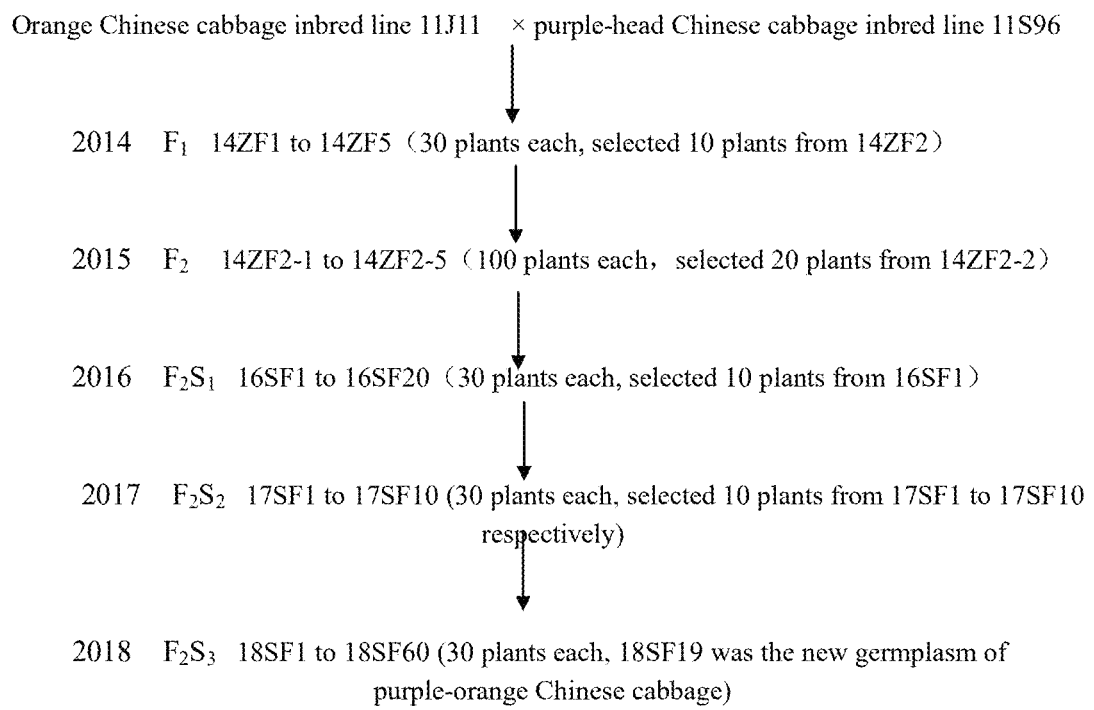
FIG. 2 is a flow chart of the breeding method of the embodiment.
Figure 3:
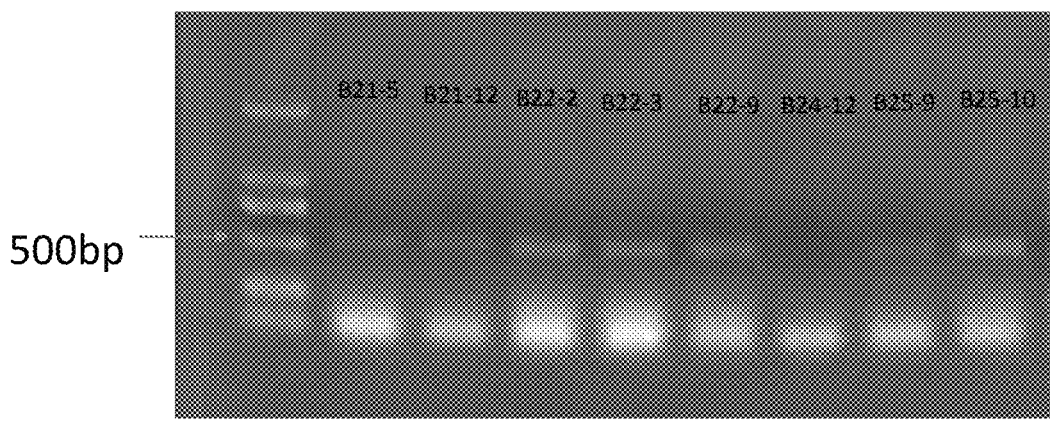
FIG. 3 is the orange gene molecular marker. Each lane is a 17SF1 single plant.
Figure 4:
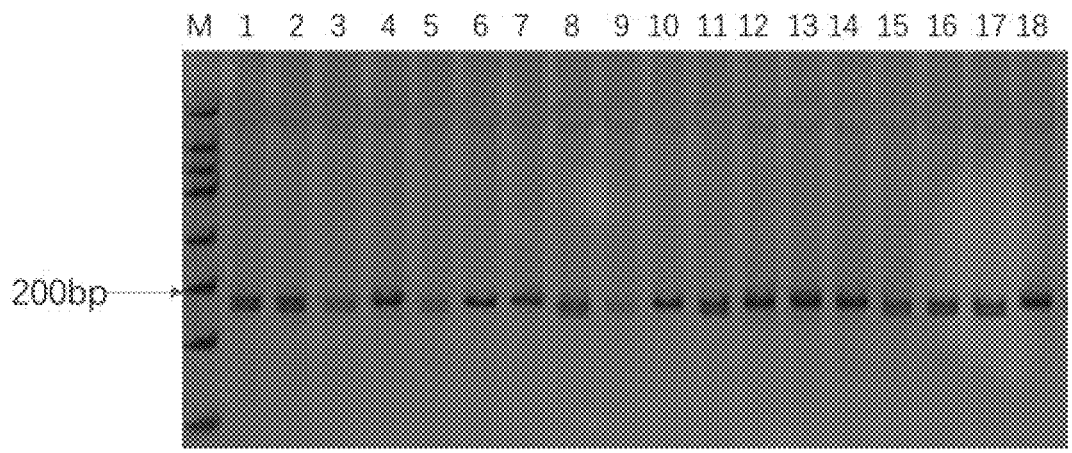
FIG. 4 is the molecular marker of the purple-head gene. Lanes 1-18 are individual plants of 17SF1, respectively.

Example 1. A Breeding Method of a New Germplasm of Purple-Orange Chinese Cabbage In 2014, the applicant of the present invention started to create a new germplasm of purple-orange Chinese cabbage according to the flowchart shown in FIG. 1. Through the hybridization of orange Chinese cabbage and purple-head Chinese cabbage, molecular marker selection and continuous selfing of individual plants, after 4 generations of selection, a new Chinese cabbage germplasm with green rosette leaves and outer leaves of leaf head and purple-orange head leaves was obtained. The flow chart of the specific breeding operation is shown in FIG. 2. The specific breeding operation steps were as follows:

1. In the spring of 2014, the orange Chinese cabbage inbred line 11J11 was used as the female parent and the purple-head Chinese cabbage inbred line 11S96 was used as the male parent for single plant to plant pairing crossing, 5 $F_1$ plants of hybrid generation seeds ($F_1$ generation) were obtained, and numbered from 14ZF1 to 14ZF5. Planted $F_1$ seeds in the autumn of 2014 (30 plants for each $F_1$ of 14ZF1 to 14ZF5, 150 plants in total), and observed the horticultural traits of individual plants of $F_1$ generation. In the 14ZF2 population, 10 individual plants with strong disease resistance and good heading property (strong disease resistance means that its disease resistance is stronger than that of the parents, and the disease resistance is specifically resistance to virus disease, soft rot and downy mildew disease; good heading property means that its heading property is better than that of the parents, and the heading property is specifically the heading firmness) were selected, and let them got vernalization naturally.

2. In the spring of 2015, individual plants selected from 14ZF2 were cultivated and selfed (10 plants in total), and 5 strains of $F_2$ population seeds were obtained, and numbered from 14ZF2-1 to 14ZF2-5. Planted seeds of each $F_2$ population strains (100 plants for each from 14ZF2-1 to 14ZF2-5, 500 plants in total) in the autumn of 2015, and observed the segregation of traits of the plants. In the 14ZF2-2 population, 20 individual plants with good heading property and carrying orange gene and purple-head gene were selected, and let them got vernalization naturally. The orange gene referred to a mutant (Brcritso) of the carotenoid isomerase gene (BrCRITSO); Due to the insertion mutation (Brcritso) of BrCRITSO, its function was lost, resulting in the accumulation of prolycopene to produce orange; The nucleotide sequence of the orange gene Brcritso was shown as SEQ ID NO.8. The purple-head gene referred to the mutant BrMYB2 of the Brmyb2 gene of Chinese cabbage; Due to the deletion mutation(BrMYB2) of Brmyb2, the original non-expressing Brmyb2 gene, highly expresses BrMYB2, thereby regulating the anthocyanin synthesis gene and making Chinese cabbage leaf head accumulating anthocyanins and showing purple-head trait; The nucleotide sequence of the purple-head gene BrMYB2 was shown as SEQ ID NO.9.

1) The method for identifying whether the plant to be tested carries the orange gene Brcritso was as follows: using the genomic DNA of the plant to be tested as a template, the following C-F and C-R primers were used for PCR amplification to obtain a PCR product. The primers sequences were as follows:

```
C-F:
                                       (SEQ ID NO. 1)
CAGAAACATCAGGGTTGAAATC;

C-R:
                                       (SEQ ID NO. 2)
TTACTGCCGAAAGCGAAA.
```

The PCR amplification procedure was as follows: 95° C. pre-denaturation for 3 min; 95° C. denaturation for 30 s, 57° C. annealing for 30 s, 72° C. extension for 1 min, 38 cycles; 72° C. extension for 10 min.

The PCR amplification system was as follows: primer C-F (10 μmol) 1 μL, primer C-R (10 μmol) 1 μL, DNA template (50 ng/μL) 2 μL, Genstar mix 10 μL, and made up to 20 μL with RNase-Free ddH$_2$O.

The PCR products were electrophoresed on a 9% non-denaturing PAGE gel and separated at a constant pressure of 180V for 80-110 min. Finally, a 0.1% silver nitrate solution was used for silver staining. Determined whether the plant to be tested carried the orange gene Brcritso according to the presence and size of the PCR product: If the PCR product of the plant to be tested contains a fragment with a size of 536 bp, the plant to be tested carries the orange gene Brcritso; If the PCR product of the plant to be tested does not contain a 536 bp fragment, the plant to be tested does not carry the orange gene Brcritso. The nucleotide sequence of the 536 bp fragment was shown in SEQ ID NO.5.

2) The method for identifying whether the plant to be tested carried the purple-head gene BrMYB2 was as follows: Using the genomic DNA of the plant to be tested as a template, PCR amplification was performed using the following Z-F and Z-R primers to obtain a PCR product. The primers sequences were as follows:

```
Z-F:
                                       (SEQ ID NO. 3)
TGTCTATCTGACTTGTGGTGT;

Z-R:
                                       (SEQ ID NO. 4)
ATACCTCATAACACTGCATCCATAG.
```

The PCR amplification system was as follows: pre-denaturation at 94° C. for 4 min; denaturation at 94° C. for 30 s, annealing at 55° C. for 30 s, extension at 72° C. for 30 s, 30 cycles; extension at 72° C. for 5 min.

The PCR amplification system was as follows: genomic DNA 50 ng, 2×Taq Master (Vazyme) 5.0 μL, primer Z-F 0.5 μmol, primer Z-R 0.5 μmol, and finally diluted to 10.0 μL with enzyme-free water.

The PCR products were electrophoresed on a 9% non-denaturing PAGE gel and separated at a constant pressure of 180V for 80-110 min. Finally, a 0.1% silver nitrate solution was used for silver staining and statistical analysis. Determined whether the tested plant carried the purple gene BrMYB2 according to the presence and size of the PCR product: If the PCR product of the tested plant only contains a fragment of 185 bp or both fragments of 185 bp and 178 bp, the plant to be tested carries purple-head gene BrMYB2 (When the PCR product contains only a fragment of 185 bp, the plant to be tested is a homozygote carrying the purple-head gene BrMYB2; when the PCR product contains both fragments of 185 bp and 178 bp, the plant to be tested is a heterozygote carrying the purple-head gene BrMYB2); If the PCR product of the plant to be tested only contains a fragment of 178 bp, the plant to be tested does not carry the purple-head gene BrMYB2. The nucleotide sequence of the 185 bp fragment is shown in SEQ ID NO.6. The nucleotide sequence of the 178 bp fragment is shown in SEQ ID NO.7.

3. In the spring of 2016, cultivated individual plants selected from 14ZF2-2 and selfed the individual plants to obtain 20 strains of the $F_2S_1$ population seeds, numbered from 16SF1 to 165F20. Planted the seeds of the $F_2S_1$ population in the autumn of 2016 (30 plants for each stain of 16SF1 to 16SF20, 600 plants in total), observed the segregation of traits, selected 10 individual plants with good heading property and carrying the orange gene and the purple-head gene among the 16SF1 population (the selection method was the same as step 2), and let them got vernalization naturally.

4. In the spring of 2017, individual plants selected from 16SF1 were cultivated, and the individual plants were selfed to obtain 10 strains of seeds of the $F_2S_2$ population, numbered from 17SF1 to 17SF10. Planted the seeds of the $F_2S_2$ population in the autumn of 2017 (30 plants for each stain of 17SF1 to 17SF10, 300 plants in total). Observed the segregation of traits. Selected 10 individual plants with good heading property and carrying the orange gene and the purple-head gene respectively in each stain of 17SF1 to 17SF10 (the selection method was the same as step 2), and let them got vernalization naturally.

Figure 5:
FIG. 5 is a picture of the leaf head of the new purple-orange Chinese cabbage germplasm 18SF19.
Figure 6:
FIG. 6 is the sectional view of the leaf head of the new purple-orange Chinese cabbage germplasm 18SF19.

5. In the spring of 2018, individual plants selected from 17SF1 to 17SF10 were cultivated, and the individual plants (100 plants) were selfed to obtain 60 strains of seeds of the $F_2S_3$ population, numbered from 18SF1 to 185F60. In the autumn of 2018, the seeds of the $F_2S_3$ population (30 plants each from 18SF1 to 18SF60, 1800 plants in total) were planted in the field. Observed the segregation of traits, the horticultural traits of the 18SF19 line were found to be consistent(the horticultural traits included: plant type, leaf color, petiole color, shape and size of leaf head, head type, color of leaf head), also good heading, the rosette leaves and the outer leaves of the leaf head were green, and the head leaves were purple-orange. The purple-orange Chinese cabbage was identified carrying the orange gene and the purple-head gene by molecular markers, and it was named as a new germplasm of purple-orange Chinese cabbage 18SF19, its phenotype was shown in FIG. 5 and FIG. 6.

The new purple-orange Chinese cabbage germplasm 18SF19 selected and bred by the invention had the following characteristics: good heading, closed head with high degree of overlapping leaf, high-narrow obovate head, the rosette leaves and outer leaves of the leaf head were green, the head leaves were purple-orange, the purple color of the inner leaves of leaf head gradually deepened from outside to inside (from light purple to dark purple of the heart leaves). The new purple-orange Chinese cabbage germplasm 18SF19 of the present invention completes the perfect combination of the orange character and the purple-head character, enriches the Chinese cabbage germplasm resources, and lays the foundation for cultivating the new purple-orange Chinese cabbage variety.

Example 2: Detection of Carotenoid and Anthocyanin Content in 18SF19, a New Germplasm of Purple-Orange Chinese Cabbage The carotenoid content and the anthocyanin content of the new purple-orange Chinese cabbage germplasm 18SF19 obtained in Example 1 were detected respectively.

The specific detection procedure of the carotenoid content of the new germplasm 18SF19 of purple-orange Chinese cabbage referred to the method in the literature "Mo Yunan, Zhang Lugang, Wang Guofang, Extraction and Determination of Total Carotenoids in Orange Heading Chinese Cabbage, Journal of Northwest A&F University (Natural Science Edition), 2014, 42(3): 1-9".

The specific detection procedure of the anthocyanin content of the new germplasm 18SF19 of purple-orange Chinese cabbage referred to the method in the literature "Duan Yanjiao, Zhang Lugang, He Qiong, etc., Expression of Transcriptional Factors and Structural Genes of Anthocyanin Biosynthesis in Purple-heading Chinese Cabbage, Acta Horticulturae Sinica 2012, 39 (11): 2159-2167".

The test results showed that the carotenoid content of the new purple-orange Chinese cabbage germplasm 18SF19 was 32.847 μg/gFW; the anthocyanin content of the new purple-orange Chinese cabbage germplasm 18SF19 was 171.03 μg/gFW. The new purple-orange Chinese cabbage germplasm 18SF19 of present invention not only had beautiful color, but was also rich in carotenoids and anthocyanins, and rich in nutrients.

The above are only the preferred embodiments of the present invention. It should be pointed out that for those of ordinary skill in the field, without departing from the technical principles of the present invention, several improvements and modifications can be made. These improvements and modifications should also be regarded as the protection scope of the present invention.

INDUSTRIAL APPLICATION

The invention provides a method for breeding new purple-orange Chinese cabbage germplasm, and successfully selected and bred new purple-orange Chinese cabbage germplasm by using the breeding method provided by the invention.

The new purple-orange Chinese cabbage germplasm has the following characteristics: good heading property, closed head with high degree of overlapping leaf, high-narrow obovate head, the rosette leaves and outer leaves of the leaf head are green, the head leaves are purple-orange, the purple color of the inner leaves of leaf head gradually deepens from outside to inside. It has beautiful color, is rich in carotenoids and anthocyanins, and rich in nutrients. The new purple-orange Chinese cabbage germplasm bred by the present invention completes the perfect combination of the orange character and the purple-head character, and not only enriches Chinese cabbage breeding materials, lays the foundation for breeding the new purple-orange Chinese cabbage variety, but also set a precedent for the aggregation of the head color traits of Chinese cabbage.

DEPOSIT INFORMATION

Applicant has made a deposit of representative seeds of orange Chinese cabbage inbred line 11J11 with the China Center for Type Culture Collection (CCTCC), Wuhan University, Wuhan, China. The deposit of the orange Chinese cabbage inbred line 11J11 was assigned Registration No. CCTCC No: P202505. The date of deposit of the seeds of the inbred line 11J11 with the CCTCC was Apr. 16, 2025. Applicant has made a deposit of representative seeds of purple-head Chinese cabbage inbred line 11S96 with the China Center for Type Culture Collection (CCTCC), Wuhan University, Wuhan, China. The deposit for the purple-head Chinese cabbage inbred line 11S96 was assigned Registration No. CCTCC No: P202514. The date of deposit of the seeds of the inbred line 11S96 with the CCTCC was Apr. 16, 2025. Access to both seed stocks will be available during the pendency of the application to the Commissioner of Patents and Trademarks and persons determined by the Commissioner to be entitled thereto upon request. Upon allowance of any claims in the application, the Applicant will make the deposits available to the public pursuant to 37 C.F.R. § 1.808. These deposits of the orange Chinese cabbage inbred line 11J11 and the purple-head Chinese cabbage inbred line 11S96 will be maintained in the CCTCC depository, which is a public depository, for a period of 30 years, or 5 years after the most recent request, or for the enforceable life of the patent, whichever is longer, and will be replaced if it becomes nonviable during that period. Additionally, Applicant has or will satisfy all the requirements of 37 C.F.R. §§ 1.801-1.809, including providing an indication of the viability of the sample upon deposit. Applicant has no authority to waive any restrictions imposed by law on the transfer of biological material or its transportation in commerce. Applicant does not waive any infringement of their rights granted under this patent or under the Plant Variety Protection Act (7USC2321 et seq.).

The invention claimed is:

1. A method for breeding purple-orange Chinese cabbage, comprises the steps:
   A) crossing an orange Chinese cabbage inbred line 11J11, representative seed of the inbred line having been deposited under China Center for Type Culture Collection (CCTCC) Registration Number P202505, as a female parent and a purple-head Chinese cabbage inbred line 11S96, representative seed of the inbred line having been deposited under China Center for Type Culture Collection (CCTCC) Registration Number P202514, as a male parent to obtain $F_1$ generation plants;
   B) selecting individual plants with a stronger disease resistance to a disease selected from the group consisting of viral diseases, soft rot, and downy mildew than that of the parents from the $F_1$ generation plants for selfing to obtain $F_2$ generation plants; and
   C) selecting, from the $F_2$ generation plants, individual plants carrying both the orange gene and the purple-head gene;
   wherein the orange gene is a Brcritso gene having a nucleotide sequence shown in SEQ ID NO. 8 of the sequence listing; and
   wherein the purple-head gene is a BrMYB2 gene having a nucleotide sequence shown in SEQ ID NO. 9 of the sequence listing; and
   D) performing, with the selected $F_2$ generation plants, 3 cycles of continuous selfing to obtain the purple-orange Chinese cabbage.

2. The method according to claim 1, further comprising:
   testing whether or not the plant under test carries the orange gene by:
      amplifying a genomic DNA of the plant to be tested with primers consisting of a first single-stranded DNA shown in SEQ ID NO. 1 of the sequence listing and a second single-stranded DNA shown in SEQ ID NO. 2 of the sequence listing to obtain a first PCR product; and evaluating the first PCR product for the presence of a first fragment of 536 bp, wherein
if the first PCR product contains the first fragment of 536 bp, the plant under test carries the orange gene; and
if the first PCR product of the plant under test does not contain the first fragment of 536 bp, the plant under test does not carry the orange gene; and testing whether or not the plant under test carries the purple-head gene by:
amplifying the genomic DNA of the plant to be tested with primers consisting of a third single-stranded DNA shown in SEQ ID NO. 3 of the sequence listing and a fourth single-stranded DNA shown in SEQ ID NO. 4 of the sequence listing to obtain a second PCR product; and
evaluating the second PCR product for the presence of a second fragment of 185 bp and a third fragment of 178 bp, wherein
if the second PCR product contains the second fragment of 185 bp, the plant under test carries the purple-head gene; and
if the second PCR product contains only the third fragment of 178 bp, the plant under test does not carry the purple-head gene.

3. A method for breeding purple-orange Chinese cabbage, comprises the steps:
1) crossing the orange Chinese cabbage inbred line 11J11, representative seed of the inbred line having been deposited under China Center for Type Culture Collection (CCTCC) Registration Number P202505, as the female parent and the purple-head Chinese cabbage inbred line 11S96, representative seed of the inbred line having been deposited under China Center for Type Culture Collection (CCTCC) Registration Number P202514, as the male parent to obtain $F_1$ generation plants; planting the $F_1$ generation seeds to obtain $F_1$ generation plants, and selecting a plurality of individual $F_1$ generation plants with a resistance to a disease selected from the group consisting of viral diseases, soft rot, and downy mildew, and good head firmness;
2) selfing the individual plants obtained in step 1) to obtain the seeds of a $F_2$ population; planting the seeds of the $F_2$ population to obtain $F_2$ generation plants, and selecting a plurality of individual $F_2$ generation plants carrying both the orange gene and purple-head gene;
wherein the orange gene is a Brcritso gene having a nucleotide sequence shown in SEQ ID NO. 8 of the sequence listing; and
wherein the purple-head gene is a BrMYB2 gene having a nucleotide sequence shown in SEQ ID NO. 9 of the sequence listing; and
3) selfing the individual $F_2$ generation plants selected in step 2) to obtain the seeds of a $F_2S_1$ population; planting the seeds of the $F_2S_1$ population to obtain $F_2S_1$ generation plants, and selecting a plurality of individual $F_2S_1$ generation plants carrying both the orange gene and purple-head gene;
4) selfing the individual $F_2S_1$ generation plants selected in step 3) to obtain the seeds of a $F_2S_2$ population; planting the seeds of the $F_2S_2$ population to obtain $F_2S_2$ generation plants, and selecting a plurality of individual plants from the $F_2S_2$ generation plants carrying both the orange gene and purple-head gene; and
5) selfing the individual plants obtained in step 4) to obtain the seeds of a $F_2S_3$ population; plant the seeds of the $F_2S_3$ population to obtain $F_2S_3$ generation plants and both the orange gene and purple-head gene and with uniform horticultural traits from the $F_2S_2$ generation plants to obtain the purple-orange Chinese cabbage.

4. The method according to claim 1, characterized in that the color of the head leaves of said purple-orange Chinese cabbage are purple-orange.

5. The purple-orange Chinese cabbage plant obtained by utilizing a breeding method according to claim 1.

* * * * *